US012033591B2

(12) United States Patent
Wu et al.

(10) Patent No.: US 12,033,591 B2
(45) Date of Patent: Jul. 9, 2024

(54) DISPLAY DEVICE AND CALIBRATION METHOD

(71) Applicant: Radiant Opto-Electronics Corporation, Kaohsiung (TW)

(72) Inventors: Peng-Hsiang Wu, Kaohsiung (TW); Hung-Pao Wu, Kaohsiung (TW); Chun-Yi Sun, Kaohsiung (TW); Jon-Hong Lin, Kaohsiung (TW); Lian-Young Lee, Kaohsiung (TW); Bo-Ru Huang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/060,973

(22) Filed: Dec. 2, 2022

(65) Prior Publication Data

US 2023/0154419 A1 May 18, 2023

Related U.S. Application Data

(63) Continuation of application No. PCT/CN2021/130863, filed on Nov. 16, 2021.

(51) Int. Cl.
*G09G 3/34* (2006.01)

(52) U.S. Cl.
CPC ... *G09G 3/3406* (2013.01); *G09G 2320/0233* (2013.01); *G09G 2320/0626* (2013.01); *G09G 2320/0693* (2013.01); *G09G 2360/16* (2013.01)

(58) Field of Classification Search
CPC .......... G09G 3/3406–3426; G09G 2320/0233; G09G 2320/0626; G09G 2320/0693; G09G 2360/16
See application file for complete search history.

(56) References Cited

U.S. PATENT DOCUMENTS

| | | | | |
|---|---|---|---|---|
| 9,826,596 | B2 * | 11/2017 | Hussain | H05B 45/355 |
| 9,865,199 | B2 * | 1/2018 | Kita | H04N 1/00458 |
| 10,373,568 | B2 * | 8/2019 | Yamashita | G09G 3/342 |
| 2008/0128594 | A1 | 6/2008 | Lo et al. | |
| 2010/0214207 | A1 * | 8/2010 | Hosoki | H05B 41/3927<br>345/101 |
| 2014/0062328 | A1 | 3/2014 | Toyooka | |

(Continued)

FOREIGN PATENT DOCUMENTS

| | | |
|---|---|---|
| CN | 101426313 A | 5/2009 |
| CN | 102097071 A | 6/2011 |

(Continued)

*Primary Examiner* — Gene W Lee
(74) *Attorney, Agent, or Firm* — CKC & Partners Co., LLC

(57) ABSTRACT

A display device includes a display panel, a backlight module and a circuit. The display panel includes multiple regions. The back light module includes multiple light emitting units, and each region corresponds to at least one of the light emitting units. The circuit includes a calibration lookup table corresponding to a first light emitting unit. The calibration lookup table records a parameter and multiple duty cycles. The circuit accesses the calibration lookup table and determines an output duty cycle according to the duty cycles. The circuit determines a current value of the first light emitting unit to drive the first light emitting unit according to the output duty cycle and the parameter.

8 Claims, 8 Drawing Sheets

(56) References Cited

U.S. PATENT DOCUMENTS

| | | | | |
|---|---|---|---|---|
| 2014/0097765 | A1* | 4/2014 | Hussain | H05B 45/22 315/224 |
| 2014/0292634 | A1* | 10/2014 | Kita | G09G 3/342 345/102 |
| 2016/0293115 | A1* | 10/2016 | Yamashita | G09G 3/3406 |
| 2019/0088204 | A1 | 3/2019 | Zhang et al. | |

FOREIGN PATENT DOCUMENTS

| | | | |
|---|---|---|---|
| CN | 102472903 | A | 5/2012 |
| CN | 102472904 | A | 5/2012 |
| CN | 102498507 | A | 6/2012 |
| CN | 104766567 | A | 7/2015 |
| CN | 110010085 | A | 7/2019 |
| CN | 112599095 | A | 4/2021 |
| TW | 200844592 | A | 11/2008 |

* cited by examiner

DISPLAY DEVICE AND CALIBRATION METHOD

RELATED APPLICATIONS

This application is a continuation of International application No. PCT/CN2021/130863, filed Nov. 16, 2021 which is herein incorporated by reference.

BACKGROUND

Field of Invention

The present disclosure relates to a calibration method of a backlight module in a display device.

Description of Related Art

A liquid crystal display device includes a liquid crystal display panel and a backlight module. Generally, the backlight module includes multiple light-emitting diodes to serve as a light source. The brightness level of the light-emitting diodes is based on the magnitude of the current flowing through the corresponding the light-emitting diode. In some conventional technologies, a maximum current is first set, and then the current magnitude is adjusted by a duty cycle to determine the brightness level. However, due to factors such as process variation, different brightness levels may be produced even identical current magnitudes are used to drive the light-emitting diodes. Therefore, how to perform calibration so that the light-emitting diodes produce expected brightness levels is the concern of those skilled in the art.

SUMMARY

Embodiments of the present disclosure provide a display device including a display panel, a backlight module, and a circuit. The display panel includes multiple regions. The backlight module includes multiple light emitting units, and each of the regions corresponds to at least one of the light emitting units. The circuit includes at least one calibration lookup table corresponding to a first light emitting unit of the light emitting units. The calibration lookup table records a parameter and multiple duty cycles. The circuit is configured to access the calibration lookup table to obtain one of the duty cycles and determine an output duty cycle. The circuit is configured to determine a current value of the first light emitting unit to drive the first light emitting unit according to the output duty cycle and the parameter.

In some embodiments, the circuit is configured to drive the first light emitting unit to produce multiple brightness levels according to the duty cycles and the parameter. The duty cycles and the brightness levels define a brightness-duty-cycle response curve which is a piecewise linear function consisting of multiple linear functions.

In some embodiments, each of the linear functions includes a slope and a group of duty cycles. The duty cycles corresponding to the linear functions include a first group of duty cycles and a second group of duty cycles. A minimum value of the first group of duty cycles is equal to a maximum value of the second group of duty cycles. The slope of the linear function corresponding to the first group of duty cycles is greater than the slope of the linear function corresponding to the second group of duty cycles.

In some embodiments, each of the linear functions includes a slope and a group of duty cycles. The duty cycles corresponding to the linear functions include a first group of duty cycles and a second group of duty cycles. A minimum value of the first group of duty cycles is equal to a maximum value of the second group of duty cycles. The slope of the linear function corresponding to the first group of duty cycles is less than the slope of the linear function corresponding to the second group of duty cycles.

In some embodiments, the circuit is configured to obtain a setting value. The piecewise linear function includes at least one turning point. The at least one turning point includes one of the duty cycles and a turning-point brightness level. The circuit is configured to interpolate the output duty cycle according to the setting value and the duty cycles.

In some embodiments, the circuit is configured to calculate the output duty cycle according to a following equation.

$$D_k = D_i + \frac{(D_{i+1} - D_i)}{(B_{i+1} - B_i)} \times (B_k - B_i)$$

$D_k$ denotes the output duty cycle, $B_k$ denotes a brightness level represented by the setting value, i denotes $i^{th}$ turning point which includes a turning-point brightness level $B_i$ and a duty cycle $D_i$, a $(i+1)^{th}$, turning point includes a turning-point brightness level $B_{i+1}$ and a duty cycle $D_{i+1}$, and the brightness level $B_k$ is greater than the turning-point brightness level $B_i$ and less than the turning-point brightness level $B_{i+1}$.

In some embodiments, the circuit is configured to drive the first light emitting unit to produce a brightness level according to one of the duty cycles and the parameter. The duty cycles and the brightness level define a brightness-duty-cycle response curve which is a linear function.

In some embodiments, the circuit is configured to obtain a setting value and the circuit interpolates the output duty cycle according to the linear function and the setting value.

In some embodiments, the circuit is configured to calculate the output duty cycle according to a following equation.

$$D_k = D_n + \frac{D_m - D_n}{m - n} \times (k - n)$$

$D_k$ denotes the output duty cycle, m denotes a maximum dimming level, n denotes a minimum dimming level, k denotes a dimming level corresponding to the setting value, $D_m$ denotes a duty cycle corresponding to the maximum dimming level, and $D_n$ denotes a duty cycle corresponding to the minimum dimming level.

In some embodiments, the circuit is configured to calculate the output duty cycle according to a following equation.

$$D_k = D_n + \frac{D_m - D_n}{m - n} \times (k - n)$$

$D_k$ denotes the output duty cycle, m denotes a maximum brightness level, n denotes a minimum brightness level, k denotes a brightness level corresponding to the setting value, $D_m$ denotes a duty cycle corresponding to the maximum brightness level, and $D_n$ denotes a duty cycle corresponding to a minimum brightness level.

In some embodiments, the circuit is configured to perform a local dimming algorithm to calculate a setting value of the first light emitting unit.

From another aspect, embodiments of the present disclosure provide a calibration method for a display device including a display panel, a backlight module and a circuit. The display panel includes multiple regions. The backlight module includes multiple light emitting units. Each of the regions corresponds to at least one of the light emitting units. The calibration method includes: driving a first light emitting unit of the light emitting units to produce a first brightness level by a current according to a parameter and a first duty cycle, and measuring the first brightness level of the first light emitting unit; determining if the first brightness level of the first light emitting unit is less than a predetermined brightness level, and if the first brightness level is less than the predetermined brightness level, adjusting the parameter such that the first brightness level of the first light emitting unit meets the predetermined brightness level, and recording the adjusted parameter in a first calibration lookup table corresponding to the first light emitting unit, and defining a brightness-duty-cycle response curve based on the predetermined brightness level, the adjusted parameter and the first duty cycle; and determining whether the brightness-duty-cycle response curve of the first light emitting unit is linear or non-linear, and if the brightness-duty-cycle response curve is linear, obtaining an adjusted duty cycle according to a brightness level on the brightness-duty-cycle response curve, and if the brightness-duty-cycle response curve is non-linear, then interpolating an adjusted duty cycle according to a turning-point brightness level and a turning-point duty cycle of at least one turning point of the brightness-duty-cycle response curve.

In some embodiments, determining whether the brightness-duty-cycle response curve of the first light emitting unit is linear or non-linear includes: setting multiple candidate duty cycles, and driving the first light emitting unit based on the candidate duty cycles to obtain multiple candidate brightness levels; calculating multiple slope of the brightness-duty-cycle response curve according to the candidate duty cycles and the candidate brightness levels; and determining that the brightness-duty-cycle response curve is non-linear if a difference between a maximum slope and a minimum slope of the slops is greater than a threshold.

In some embodiments, the candidate duty cycles includes an initial duty cycle, and the calibration method further includes: selecting one of the candidate duty cycles in ascending order, and calculating the corresponding slope according to the selected candidate duty cycle and the initial duty cycle to update the maximum slope and the minimum slop; and if the difference between the maximum slope and the minimum slope is greater than the threshold, setting the selected candidate duty cycle and the corresponding candidate brightness level as a new turning point.

In some embodiments, the calibration method further includes: if the first brightness level is greater than or equal to the predetermined brightness level, not adjusting the parameter, recording the parameter in the first calibration lookup table corresponding to the first light emitting unit directly, and defining a brightness-duty-cycle response curve based on the predetermined brightness level, the parameter, and the first duty cycle.

In some embodiments, the calibration method further includes: driving the first light emitting unit to produce multiple candidate brightness levels according to multiple candidate duty cycles and the parameter, in which the candidate duty cycles and the candidate brightness levels define the brightness-duty-cycle response curve which is a piecewise linear function consisting of multiple linear functions.

In some embodiments, each of the linear functions includes a slope and a group of duty cycles, and the duty cycles corresponding to the linear functions include a first group of duty cycles and a second group of duty cycles. A minimum value of the first group of duty cycles is equal to a maximum value of the second group of duty cycles. The slope of the linear function corresponding to the first group of duty cycles is greater than the slope of the linear function corresponding to the second group of duty cycles.

In some embodiments, each of the linear functions includes a slope and a group of duty cycles. The duty cycles corresponding to the linear functions include a first group of duty cycles and a second group of duty cycles. A minimum value of the first group of duty cycles is equal to a maximum value of the second group of duty cycles, and the slope of the linear function corresponding to the first group of duty cycles is less than the slope of the linear function corresponding to the second group of duty cycles.

In some embodiments, the calibration method further includes: driving the first light emitting unit to produce a candidate brightness level according to a candidate duty cycle and the parameter, in which the candidate duty cycle and the candidate brightness level define the brightness-duty-cycle response curve which is a linear function.

In some embodiments, the light emitting units further includes a second light emitting unit, and the calibration method further includes: driving the second light emitting unit to produce a second brightness level according to the parameter, and measuring the second brightness level of the second light emitting unit; adjusting the parameter such that the second brightness level meets the predetermined brightness level, and recoding the adjusted parameter in a second calibration lookup table corresponding to the second light emitting unit; and adding the at least one turning point into the second calibration lookup table if the first calibration lookup table has the at least one turning point.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
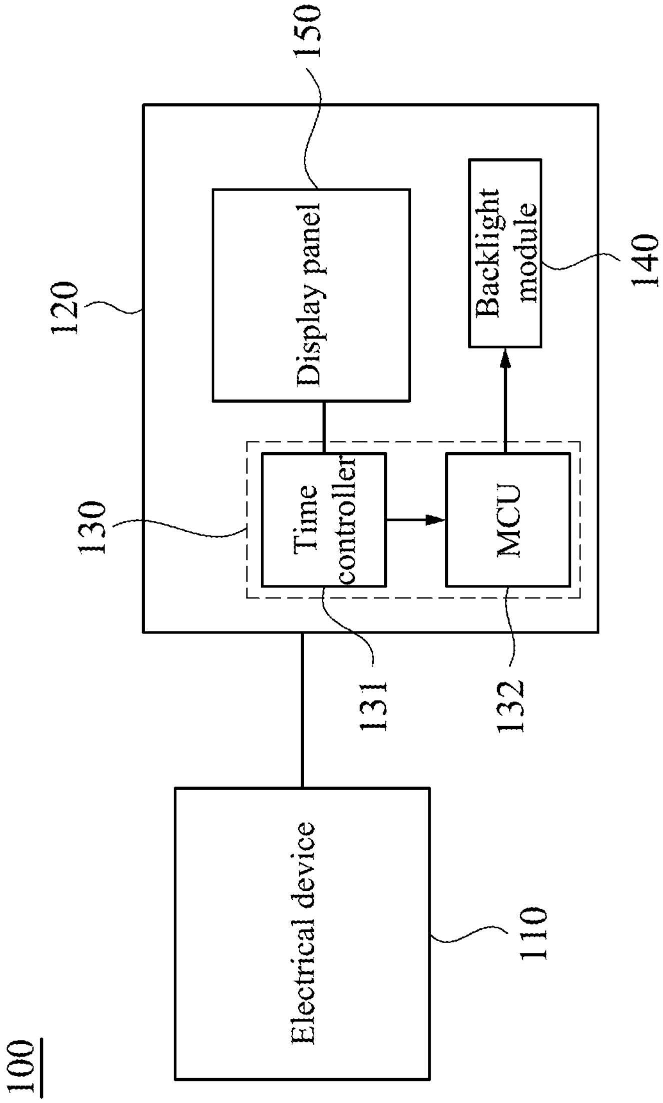
FIG. 1 is a schematic diagram of a current calibration system in accordance with an embodiment.
Figure 2:
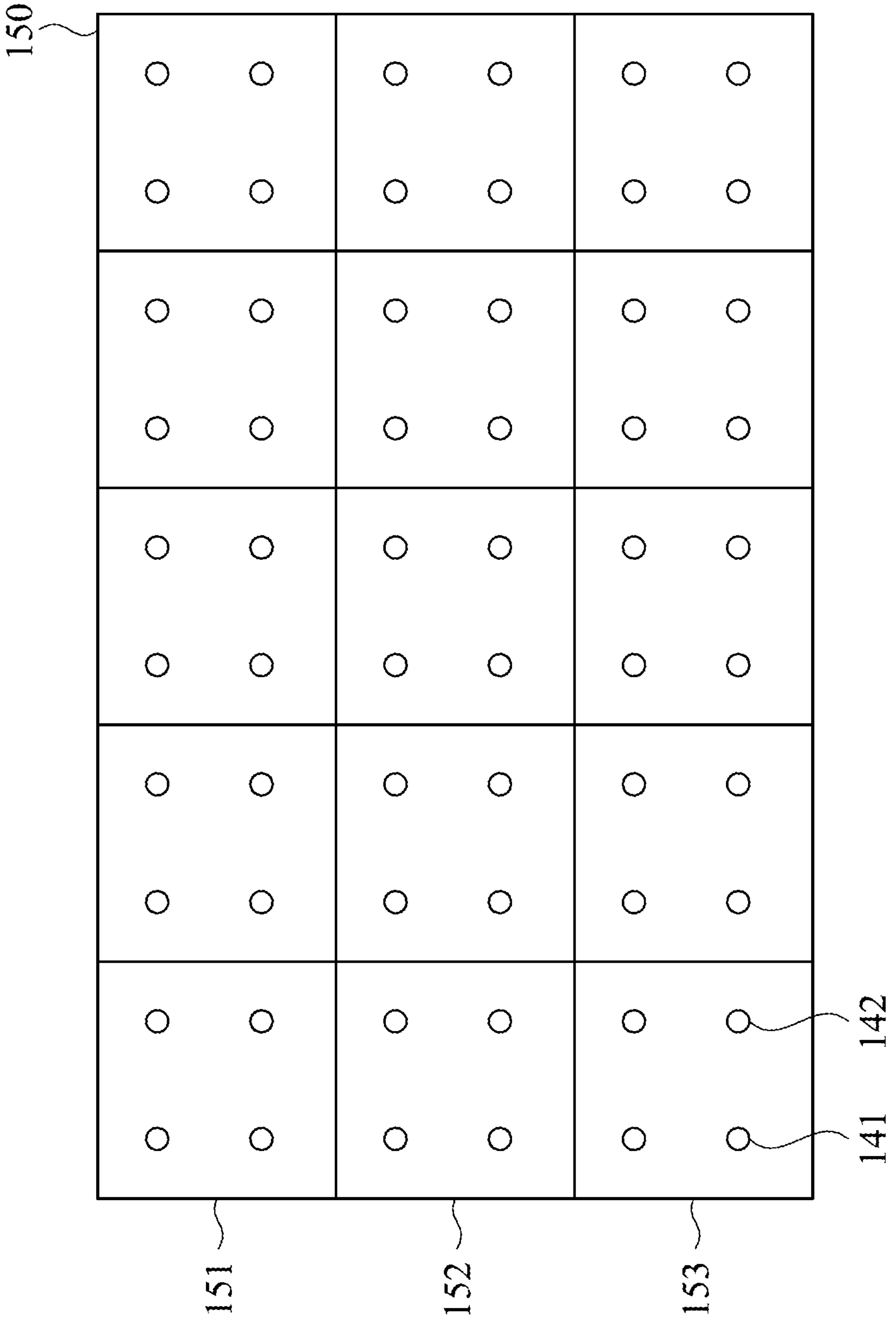
FIG. 2 is a schematic diagram of regions of the display panel and the corresponding light emitting units in accordance with an embodiment.

FIG. 1 is a schematic diagram of a current calibration system in accordance with an embodiment. Referring to FIG. 1, a current calibration system 100 includes an electrical device 110 and a display device 120. The electrical device 110 may be a personal computer, a server, or any electrical device with computation capability. The display device 120 includes a circuit 130, a backlight module 140, and a display panel 150. The circuit 130 includes a time controller 131 and a microcontroller unit (MCU) 132. The microcontroller unit 132 may be replaced with a field programmable gate array (FPGA) which is not limited in the disclosure. The backlight module 140 includes multiple light emitting units such as light-emitting diodes which are driven by currents of the backlight module 140 to serve as a backlight source. The display panel 150 is, for example, a liquid crystal display panel. FIG. 2 is a schematic diagram of regions of the display panel and the corresponding light emitting units in accordance with an embodiment. In the embodiment of FIG. 2, the display panel 150 includes 15 regions (e.g. regions 151-153), and each region corresponds to the multiple light emitting units (e.g. light emitting units 141-142). The brightness level of each light emitting unit can be controlled by the amplitude of the current flowing through the corresponding light emitting unit for increasing the contrast ratio of a frame. For example, if a portion of the frame in a particular region is relatively dark, the brightness levels of the corresponding light emitting units are decreased; and if a portion of the frame in that particular region is relatively bright, the brightness levels of the corresponding light emitting units are increased. When the frame is to be rendered, the time controller 131 calculates a setting value of each region of the display panel 150. The setting value indicates the required brightness level. In some embodiments, each light emitting unit is controlled by a switch (not shown), and a current flows through the light emitting unit when the switched is turned on, and there is no current flowing through the light emitting unit when the switch is turned off. The amplitude of the current flowing through the light emitting unit is determined by a duty cycle of the switch. FIG. 2 is merely an example, and the number of the regions in the display panel 150 and the number of the light emitting units corresponding to one region are not limited in the disclosure.

Referring to FIG. 1, the microcontroller unit 132 includes multiple calibration lookup tables. Each calibration lookup table corresponds to one of the multiple light emitting units and records at least one parameter and multiple duty cycles. The parameter is, for example, a current amplitude or other parameters for controlling the current value. The magnitude of the current flowing through the light emitting unit is determined according to the parameter and the duty cycles so as to determine the brightness level of the light emitting unit. In the embodiment, the current amplitude (mA) is multiplied with the duty cycle (%) to determine a current value (mA) of the light emitting unit. How the parameter and the duty cycles are determined will be described below.

Figure 3:
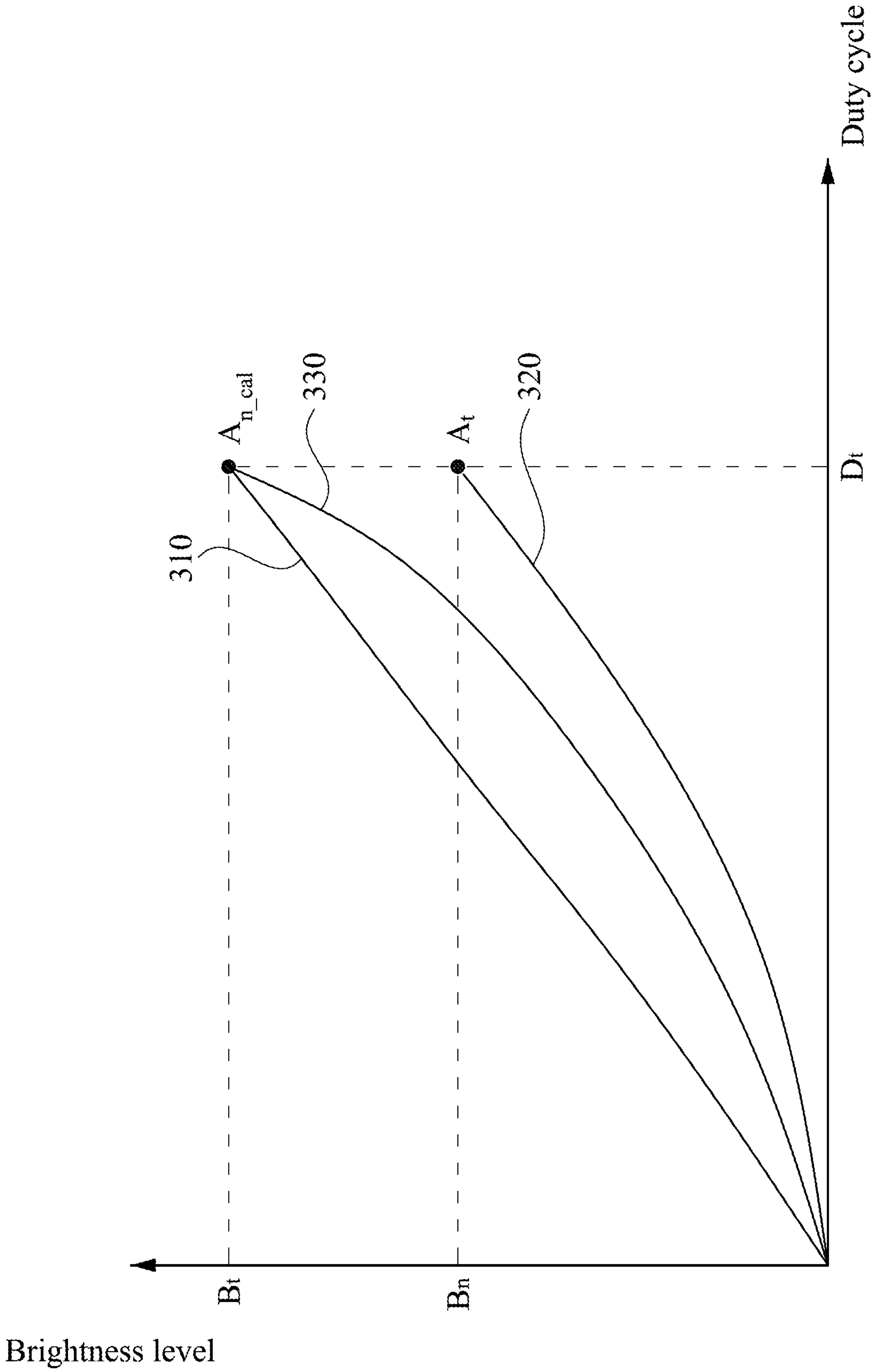
FIG. 3 is a diagram illustrating a brightness-duty-cycle response curve of the light emitting unit in accordance with an embodiment.

FIG. 3 is a diagram illustrating a brightness-duty-cycle response curve of the light emitting unit in accordance with an embodiment. Referring to FIG. 3, a straight line 310 represents a linear relationship between the brightness levels and the duty cycles. The maximum duty cycle $D_t$ (e.g. 100%) corresponds to a brightness level $B_t$ which is predetermined (e.g. based on the specification of the product). A curve 320 represents the real response curve of the light emitting unit. When the parameter (i.e. current amplitude) $A_t$ and the maximum duty cycle $D_t$ are used to drive a light emitting unit, this light emitting unit only provides a brightness level $B_n$ which is less than the predetermined brightness level $B_t$. Therefore, the brightness level corresponding to the maximum duty cycle has to be calibrated first.

In detail, when driving the light emitting unit according to the parameter $A_t$ and the duty cycle $D_t$, the electrical device 110 can measure the brightness level $B_n$ through a luminance meter or other suitable meters and determine if the brightness level $B_n$ is less than the predetermined brightness level $B_t$. If the brightness level $B_n$ is less than the predetermined brightness level $B_t$, then the parameter $A_t$ is adjusted such that the adjusted parameter $A_t$ can drive the light emitting unit to provide a brightness level which meets the predetermined brightness level $B_t$ (i.e. the difference is within a predetermined range). $A_{n\_cal}$ denotes the adjusted parameter which is recorded in the calibration lookup table. In some embodiments, the parameter $A_{n\_cal}$ may be calculated according to the parameter $A_t$ and the brightness level $B_n$ as the following Equation 1.

$$A_{n\_cal} = \frac{B_t}{B_n} \times A_t \quad \text{[Equation 1]}$$

Figure 4:
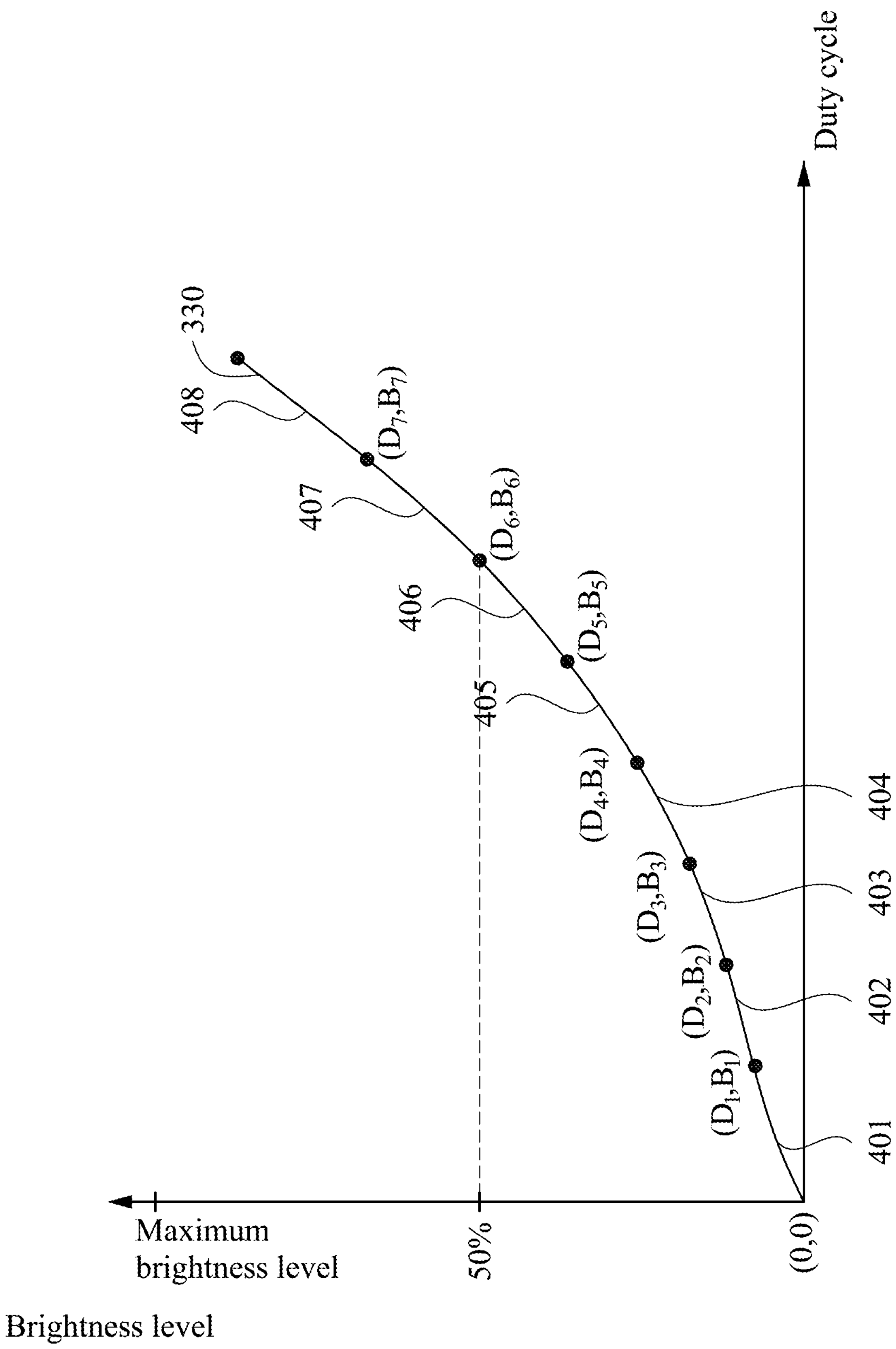
FIG. 4 is a diagram of estimating a turning point of the brightness-duty-cycle response curve in accordance with an embodiment.

Next, a brightness-duty-cycle response curve 330 is defined by the predetermined brightness level $B_t$, the adjusted parameter $A_{n\_cal}$ and the duty cycle $D_t$. The brightness-duty-cycle response curve 330 is estimated by measuring multiple brightness levels (also referred to as candidate brightness levels) when applying multiple duty cycles (also referred to as candidate duty cycles). The more the candidate brightness levels are measured, the more precise the brightness-duty-cycle response curve 330 is. FIG. 4 is a diagram of estimating a turning point of the brightness-duty-cycle response curve in accordance with an embodiment. Referring to FIG. 4, multiple candidate duty cycles $D_1$-$D_7$ are first set. The light emitting unit is driven according to the candidate duty cycles $D_1$-$D_7$ to obtain candidate brightness levels $B_1$-$B_7$. Each candidate duty cycle and the corresponding candidate brightness level constitute a coordinate such as $(D_1, B_1)$ which is a point on the brightness-duty-cycle response curve 330. Accordingly, the brightness-duty-cycle response curve 330 is determined based on the coordinates whether the curve 330 is linear or non-linear. To be specific, segments 401-408 are defined by the candidate duty cycles $D_1$-$D_7$ and the candidate brightness levels $B_1$-$B_7$. For example, the coordinate $(D_1, B_1)$ and the coordinate $(D_2, B_2)$ define the segment 402, and so on. Next, a slope of each of the segments 401-408 is calculated. For example, the slope of the segment 402 is calculated as the following Equation 2, and so on for the slops of the other segments.

$$\frac{B_2 - B_1}{D_2 - D_1} \quad \text{[Equation 2]}$$

If a difference between a maximum slope and a minimum slope along the segments 401-408 is greater than a threshold, then it is determined that the brightness-duty-cycle response curve 330 is non-linear, otherwise it is linear.

One or more turning points are also estimated in some embodiments. In detail, an initial duty cycle is set to be 0, and the corresponding brightness level is also set to be 0. A coordinate (0, 0) is a start point of the brightness-duty-cycle response curve 330. Next, the maximum slope and the minimum slope are initialized by, for example, setting the maximum slope to be 0, and setting the minimum slope to be a large number. Next, the candidate duty cycles $D_1$-$D_7$ are selected in ascending order. A slope is calculated according to the selected candidate duty cycle and the initial duty cycle. For example, the duty cycle $D_1$ is selected first, and the corresponding slope is $B_1/D_1$. If this slope is less than the minimum slope, then the minimum slope is set to be $B_1/D_1$. If this slope is greater than the maximum slope, then the maximum slope is set to be $B_1/D_1$. The next candidate duty cycle $D_2$ is then selected, and the corresponding slope is $B_2/D_2$. If the slope $B_2/D_2$ is less than the minimum slope, then the minimum slope is set to be $B_2/D_2$. If the slope $B_2/D_2$ is greater than the maximum slope, then the maximum slope is set to be $B_2/D_2$. Next, judging by whether or not the difference between the maximum slope and the minimum slope is greater than the threshold, and if yes, the currently selected candidate duty cycle $D_2$ and the corresponding candidate brightness level $B_2$ are set to be a new turning point represented as the coordinate ($D_2$, $B_2$). After finding a new turning point, the maximum slope and the minimum slope are reset, and the new turning point ($D_2$, $B_2$) is taken as a new initial point, the candidate duty cycle $D_3$ is selected, the corresponding slope $(B_3-B_2)/(D_3-D_2)$ is calculated to update maximum slope and the minimum slope, and so on for all the candidate duty cycles.

Figure 5:
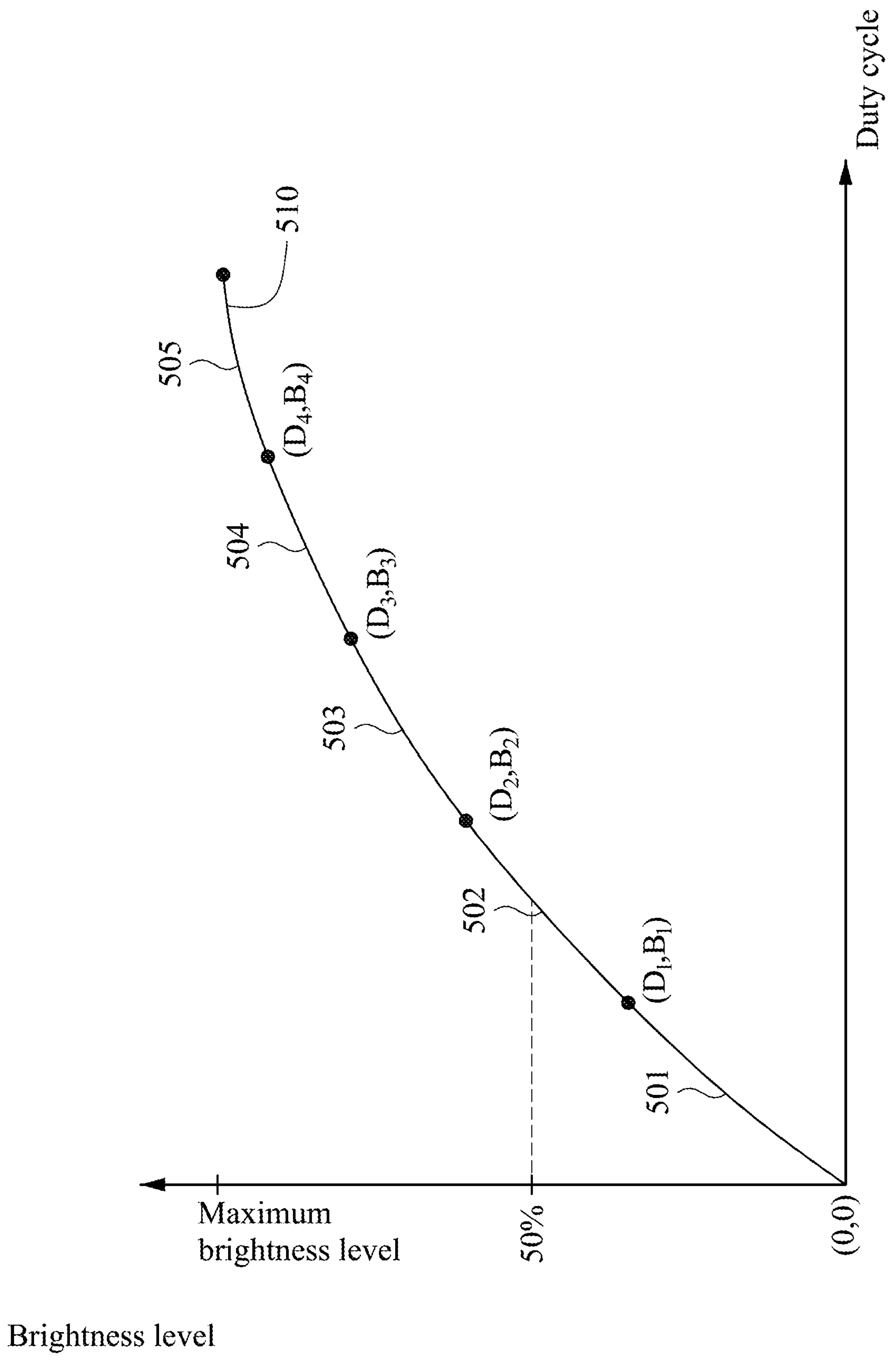
FIG. 5 is a diagram illustrating a brightness-duty-cycle response curve of the light emitting unit in accordance with an embodiment.

If no turning point is found, it means the brightness-duty-cycle response curve 330 is a linear function. If there are turning points, each time a turning point is found, the brightness-duty-cycle response curve 330 is divided into a new linear segment (i.e. linear function). That is, the brightness-duty-cycle response curve 330 will be a piecewise linear function consisting of (or approximated by) multiple linear functions. The piecewise linear function is defined by the candidate duty cycles and the candidate brightness levels. From another aspect, each linear function includes a slope and a group of duty cycles. For example, the linear function of the segment 402 includes the corresponding slope and a group of duty cycles $D_1$ and $D_2$. The slopes of the linear functions of any two groups of duty cycles are difference from the each other. For example, the duty cycles $D_5$ and $D_6$ are referred to as a first group of duty cycles, and the duty cycles $D_3$ and $D_4$ are referred to as a second group of duty cycles. The minimum value $D_5$ of the first group of duty cycles is greater than the maximum value $D_4$ of the second group of duty cycles. The slope of the linear function (i.e. segment 406) of the first group of duty cycles is greater than the slope of the linear function (i.e. segment 404) of the second group of duty cycles. For another example, the duty cycles $D_5$ and $D_6$ are referred to as a first group of duty cycles, and the duty cycle $D_4$ and $D_5$ are referred to as a second group of duty cycles. The minimum value $D_5$ of the first group of duty cycles is equal to the maximum value $D_5$ of the second group of duty cycles. The slope of the linear function (i.e. segment 406) of the first group of duty cycles is greater than the slope of the linear function (i.e. segment 405) of the second group of duty cycles. The slopes of the linear functions in embodiment of FIG. 4 are increasing. That is, the slopes of the linear functions increase as the brightness level increases. Accordingly, the backlight module 140 has more scales when the brightness level is low. Note that the brightness levels $B_1$-$B_5$ are less than 50% of the maximum brightness levels for fine-tuning. In addition, the backlight module 140 has fewer scales when the brightness level is high. Note that the brightness levels $B_6$ and $B_7$ are greater than 50% of the maximum brightness level for sharp adjustment. Therefore, this is in favor of fine-tuning brightness when the frame is dark. The slopes of the linear functions may be decreasing based on the character of the light emitting unit. For example, referring to FIG. 5, a brightness-duty-cycle response curve 510 is also a piecewise linear function consisting of (or approximated by) linear functions corresponding to segments 501-505. The slopes of the segments 501-505 are decreasing. For example, the duty cycles $D_3$ and $D_4$ are referred to as a first group of duty cycles, and the duty cycles $D_1$ and $D_2$ are referred to as a second group of duty cycles. The minimum value $D_3$ of the first group of duty cycles is greater than the maximum value $D_2$ of the second group of duty cycles. The slope of the linear function (i.e. segment 504) corresponding to the first group of duty cycles is less than the slope of the linear function (i.e. segment 502) corresponding to the second group of duty cycles. For another example, the duty cycles $D_3$ and $D_4$ are referred to as a first group of duty cycles, and the duty cycle $D_2$ and $D_3$ are referred to as a second group of duty cycles. The minimum value $D_3$ of the first group of duty cycles is equal to the maximum value $D_3$ of the second group of duty cycles. The slope of the linear function (i.e. segment 504) corresponding to the first group of duty cycles is less than the slope of the linear function (i.e. segment 503) corresponding to the second group of duty cycles. That is, the slopes of the linear functions decreased while the brightness increases. In the embodiment, the backlight module 140 has more scales for the duty cycles when the brightness level is high. Note that the brightness levels 82, $B_3$ and $B_4$ corresponding to the duty cycles $D_2$, $D_3$ and $D_4$ are higher than 50% of the maximum brightness level for fined-tuning. In contrast, the backlight module 140 has fewer scales for the duty cycles when the brightness level is low. Note that only the brightness level $B_1$ corresponding to the duty cycle $D_1$ is lower than 50% of the maximum brightness level for sharp adjustment. This is in favor of the brightness adjustment for high environment brightness (e.g. in the harsh sunlight or in a backlight status where the brightness of the display is not sufficient).

Figure 6:
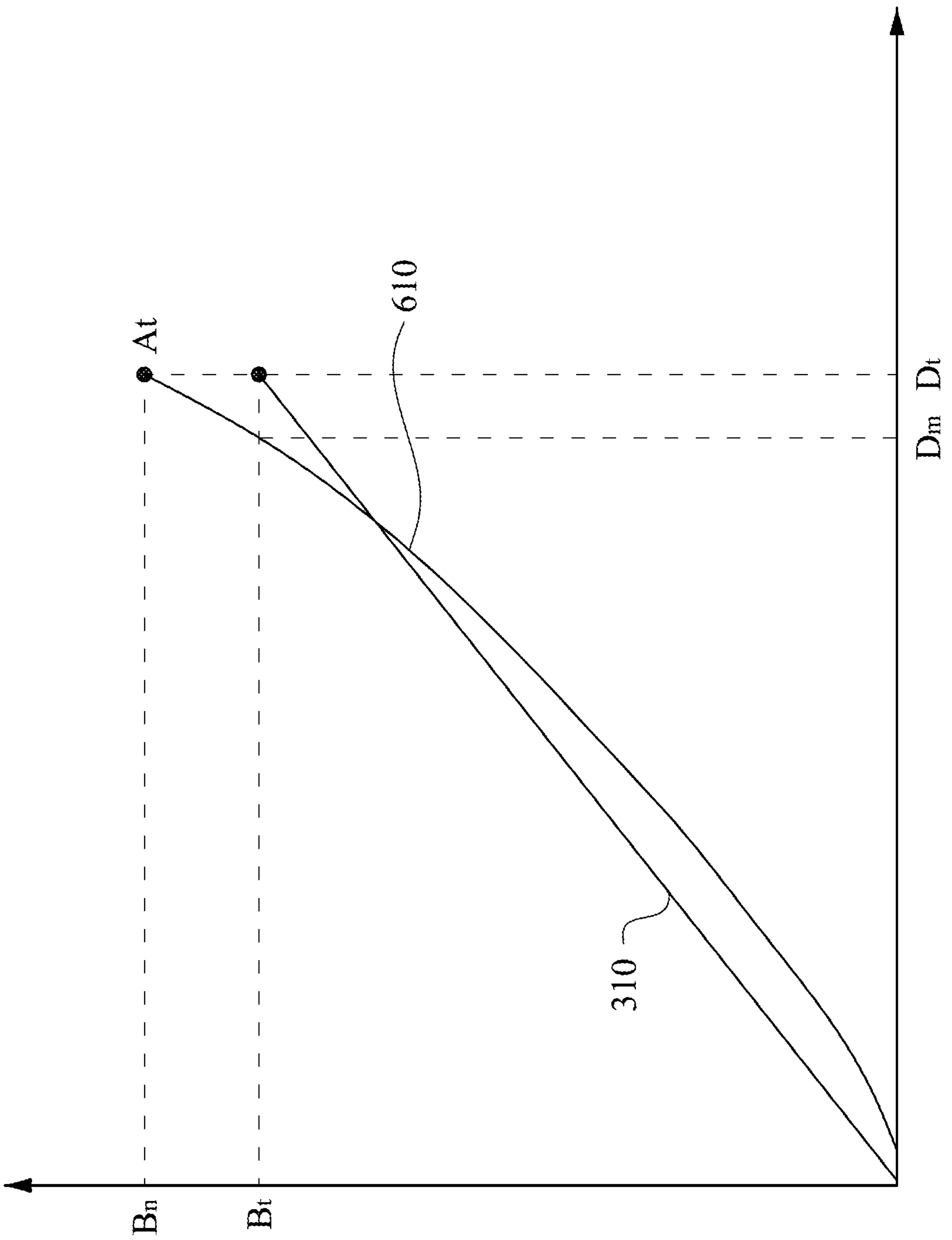
FIG. 6 is a diagram illustrating a brightness-duty-cycle response curve in accordance with an embodiment.

In the embodiment of FIG. 3, the brightness level $B_n$ is measured based on the duty cycle $D_t$ and the preset parameter $A_t$ and is less than the predetermined brightness level $B_t$. Therefore, the updated parameter should be recorded in the calibration lookup table. If the measured brightness level is greater than or equal to the predetermined brightness level, then the parameter is directly recorded in the calibration lookup table without adjustment. For example, FIG. 6 is a diagram illustrating a brightness-duty-cycle response curve 610 in accordance with an embodiment. In the embodiment of FIG. 6, after the light-emitting diode is driven based on the preset parameter $A_t$ and the duty cycle $D_t$, the measured brightness level $B_n$ is greater than the predetermined brightness level $B_t$. Therefore, the parameter $A_t$ is recorded in the corresponding calibration lookup table without adjustment. Next, the brightness-duty-cycle response curve 610 is defined by the predetermined brightness level $B_t$, the parameter $A_t$ and the duty cycle $D_m$ which is the value for driving the light emitting unit to produce the predetermined brightness level $B_t$. When the predetermined brightness level $B_t$ is required, the light emitting diode is driven based on the parameter $A_t$ and the duty cycle $D_m$. When a lower brightness level is required, only the duty cycle will be adjusted to be lower accordingly.

According to the above method, the calibration lookup table records the adjusted or the preset parameter and multiple duty cycles. For example, the content of an exemplary calibration lookup table is shown in the following Table 1.

TABLE 1

| For $n^{th}$ light emitting unit | | |
|---|---|---|
| Dimming level | Parameter | Duty cycle |
| 0 | $A_{n\_cal}$ | $D_0$ |
| 1 | | $D_1$ |
| . . . | | . . . |
| m | | $D_m$ |

Table 1 corresponds to $n^{th}$ light emitting unit. The first column records dimming levels (or brightness levels in other embodiments); the second column records the parameter which is an adjusted parameter $A_{n\_cal}$ in this example; and the third column records the corresponding duty cycles. If the corresponding brightness-duty-cycle response curve is linear, then the calibration lookup table records at least two duty cycles including a duty cycle (e.g. 0%) corresponding to the minimum dimming level and a duty cycle (e.g. $D_t$ of FIG. 3 or $D_m$ of FIG. 6) for producing the predetermined brightness level. If the corresponding brightness-duty-cycle response curve is non-linear, then the calibration lookup table additionally records the duty cycle and the dimming level of at least one turning point.

The duty cycles for the $n^{th}$ light emitting unit may be applied to other light emitting units because the brightness-duty-cycle response curves for different light emitting units should be similar under the same process. Although the same duty cycles are adopted, the brightness levels and the parameter can be estimated again. In detail, another light emitting unit (also referred to as a second light emitting unit) is driven based on the predetermined parameter, the brightness level of the second light emitting unit is measured, and then the parameter may be adjusted such that the brightness level of the second light emitting unit meets the predetermined brightness level. The adjusted parameter is recorded in the calibration lookup table (also referred to as a second calibration lookup table) corresponding to the second light emitting unit. Next, the turning point (i.e. duty cycles) of Table 1 is added into the second calibration lookup table, and the brightness levels of these duty cycles are measured. The second calibration lookup table also records the measured brightness level or the corresponding dimming levels. In this way, there is no need to re-find the turning point of the brightness-duty-cycle response curve of the second light emitting unit.

Referring to FIG. 1, the established calibration lookup table is stored in the microcontroller unit 132. When a frame is to be rendered, the time controller 131 performs a local dimming algorithm to calculate a setting value which could be a dimming level or a brightness level. The microcontroller unit 132 receives a signal indicating the setting value from the time controller 131 so as to access the corresponding calibration lookup table according to the setting value. An output duty cycle is determined according to the duty cycles in the calibration lookup table. Next, a current value of the light emitting unit is determined based on the output duty cycle and the parameter, and the current value is used to drive the light emitting unit. Since the output current of each region of the display panel is calibrated, uniform brightness is achieved to avoid a situation of uneven brightness across the regions. This method can corporate with local dimming technology so that each region can produce expected brightness. Embodiments will be provided to describe the calculation of the output duty cycle.

First, if the brightness-duty-cycle response curve is linear, then the circuit 130 obtains an adjusted duty cycle according to the brightness level of the brightness-duty-cycle response curve as the output duty cycle. That is, the circuit 130 interpolates the output duty cycle according to the linear function and the dimming level (or brightness level) to be rendered. For example, a calibration lookup table recodes an adjusted parameter $A_{n\_cal}$, a duty cycle (herein represented as $D_n$) corresponding to the minimum dimming level and the duty cycle (herein represented as $D_m$ which is not necessarily 100%) corresponding to the maximum dimming level. The calculation of the following Equation 3 is performed according to the brightness level (or dimming level) to be rendered.

$$D_k = D_n + \frac{D_m - D_n}{m - n} \times (k - n) \quad \text{[Equation 3]}$$

$D_k$ denotes the output duty cycle. m denotes the maximum dimming level (or maximum brightness level). n denotes the minimum dimming level (or minimum brightness level). k denotes the dimming level (or brightness level) of the setting value. $D_m$ denotes the duty cycle corresponding to the maximum dimming level (or maximum brightness level). $D_n$ denotes the duty cycle corresponding to the minimum dimming level (or minimum brightness level). The microcontroller unit 132 receives a signal from the time controller 131 to access the corresponding calibration lookup table according to the received brightness level (or dimming level), and determines the output duty cycle $D_k$ according to the duty cycles stored in the calibration lookup table and the Equation 3. Next, a current value of the corresponding light emitting unit is determined to drive the light emitting unit according to the output duty cycle $D_k$ and the parameter $A_{n\_cal}$ recorded in the calibration lookup table.

Figure 7:
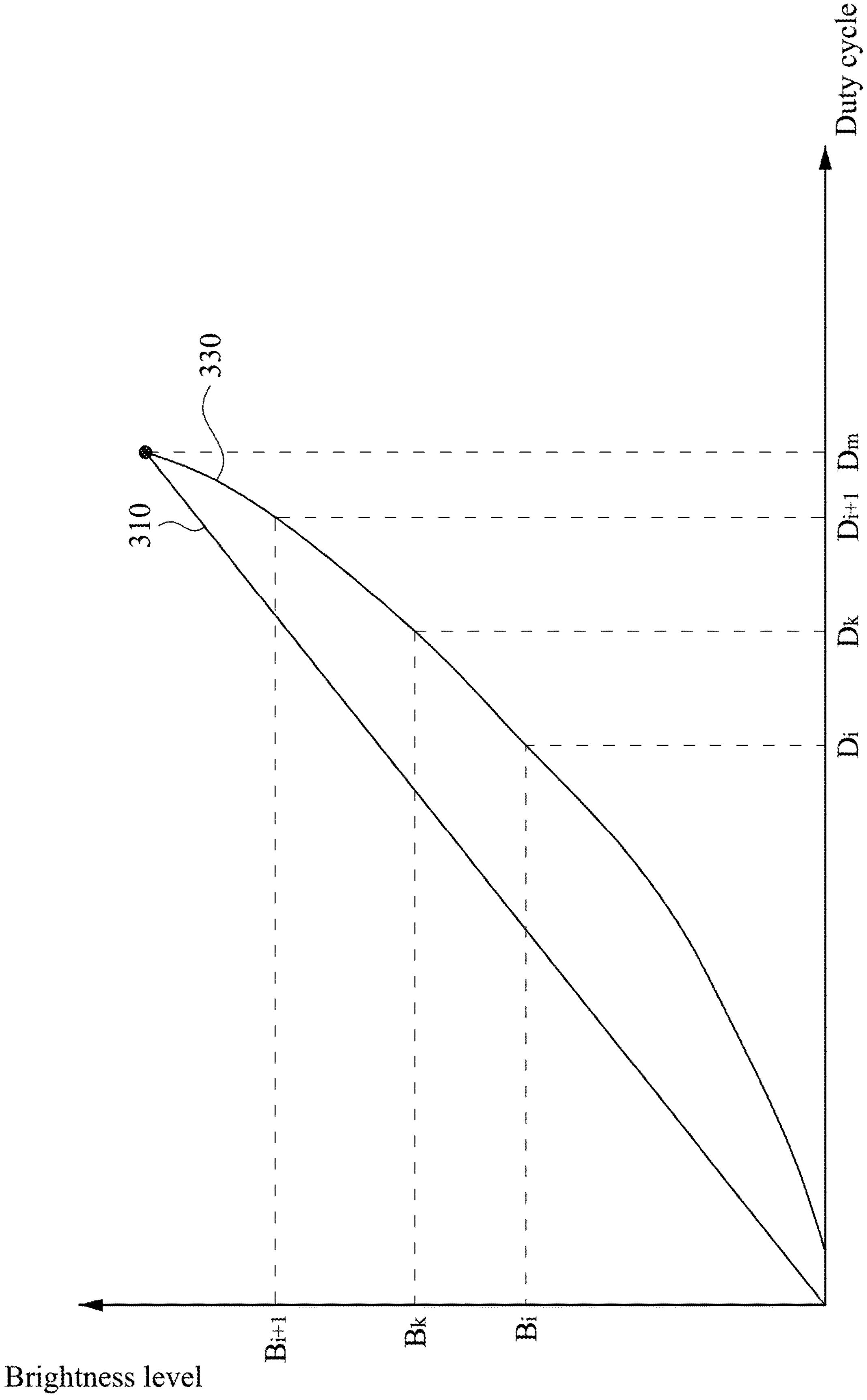
FIG. 7 is a diagram of interpolating the output duty cycle in accordance with an embodiment.

On the other hand, if the brightness-duty-cycle response curve is non-linear, then the brightness-duty-cycle response curve contains at least one turning point. Each turning point includes a turning-point brightness level (or turning-point dimming level) and a turning-point duty cycle that are stored in the calibration lookup table. The circuit 130 interpolate the output duty cycle according to the setting value, the turning-point brightness level, and the turning-point duty cycle. For example, FIG. 7 is a diagram of interpolating the output duty cycle in accordance with an embodiment. Referring to FIG. 7, $B_k$ denotes the brightness level of the setting value. Two turning-point brightness levels $B_i$ and $B_{i+1}$ closest to the brightness level $B_k$ are found in the calibration lookup table. The brightness level $B_k$ is greater than the turning-point brightness level $B_i$ and less than the turning-point brightness level $B_{i+1}$. Two turning-point duty cycles $D_i$ and $D_{i+1}$ are read from the calibration lookup table according to the turning-point brightness levels $B_i$ and $B_{i+1}$. Next, the output duty cycle $D_k$ is interpolated according to the following Equation 4.

$$D_k = D_i + \frac{(D_{i+1} - D_i)}{(B_{i+1} - B_i)} \times (B_k - B_i) \quad \text{[Equation 4]}$$

In detail, the microcontroller unit 132 receives a signal from the time controller 131, accesses the calibration lookup table according to the received brightness level (or dimming level), and determines the output duty cycle $D_k$ according to the duty cycles of the calibration lookup table and the Equation 4. Note that if the brightness level $B_k$ is equal to one of the turning-point brightness level $B_i$ in the calibration lookup table, then the turning-point duty cycle $D_i$ is outputted as $D_k$. No matter which case happens, after the output duty cycle $D_k$ is obtained, a current value is determined to drive the corresponding light emitting unit according to the output duty cycle $D_k$ and the parameter $A_{n\_cal}$ in the calibration lookup table. An expected brightness level is achieved through the above method.

Figure 8:
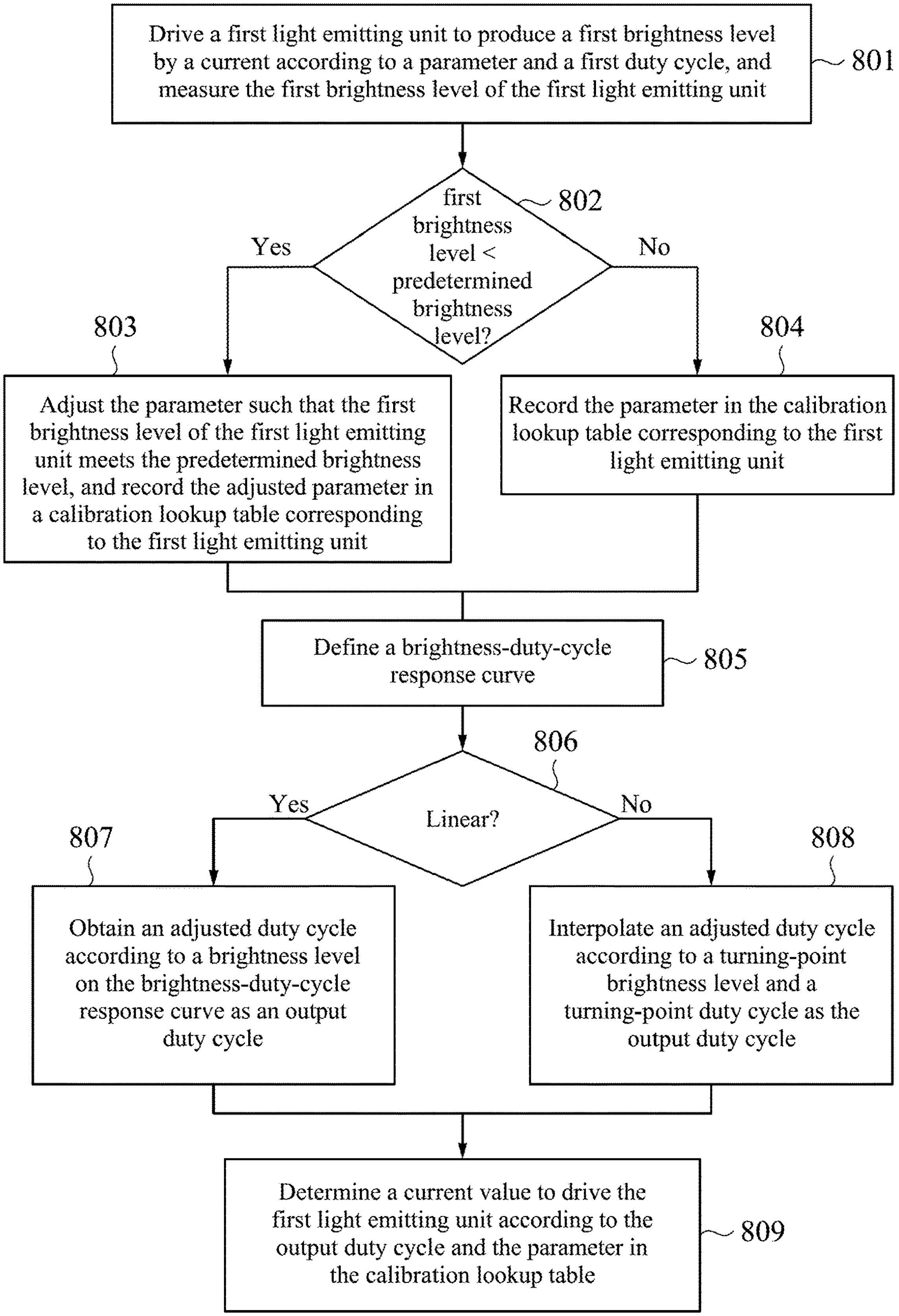
FIG. 8 is a flow chart of a calibration method of a display device in accordance with an embodiment.

FIG. 8 is a flow chart of a calibration method of a display device in accordance with an embodiment. The calibration method is performed by the electrical device 110 and the display device 120 in cooperation. Referring to FIG. 8, in step 801, a first light emitting unit is driven to produce a first brightness level by a current according to a parameter and a first duty cycle, and the first brightness level of the first light emitting unit is measured. In step 802, it is determined if the first brightness level is less than a predetermined brightness level. If the result of the step 802 is "yes", in step 803, the parameter is adjusted such that the first brightness level of the first light emitting unit meets the predetermined brightness level, and the adjusted parameter is recorded in a calibration lookup table corresponding to the first light emitting unit. If the result of the step 802 is "no", the parameter is not adjusted. In step 804, the parameter is directly recorded in the calibration lookup table corresponding to the first light emitting unit. In step 805, a brightness-duty-cycle response curve is defined. In step 806, it is determined if the brightness-duty-cycle response curve is linear. If the result of step 806 is "yes", in step 807, an adjusted duty cycle is obtained according to a brightness level on the brightness-duty-cycle response curve as an output duty cycle. If the result of step 806 is "no" (i.e. non-linear), the brightness-duty-cycle response curve contains at least one turning point. In step 808, an adjusted duty cycle is interpolated according to a turning-point brightness level and a turning-point duty cycle of the turning point as the output duty cycle. In step 809, a current value is determined to drive the first light emitting unit according to the output duty cycle and the parameter in the calibration lookup table. However, all the steps in FIG. 8 have been described in detail above, and therefore the description will not be repeated. Note that the steps in FIG. 8 can be implemented as program codes or circuits, and the disclosure is not limited thereto. In addition, the method in FIG. 8 can be performed with the aforementioned embodiments, or can be performed independently. In other words, other steps may be inserted between the steps of the FIG. 8.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device comprising:

a display panel comprising a plurality of regions;

a backlight module comprising a plurality of light emitting units, wherein each of the regions corresponds to at least one of the light emitting units; and a circuit comprising at least one calibration lookup table corresponding to a first light emitting unit of the light emitting units, wherein the at least one calibration lookup table records a parameter and a plurality of duty cycles, wherein the circuit is configured to access the calibration lookup table to obtain one of the duty cycles and determine an output duty cycle, wherein the circuit is configured to determine a current value of the first light emitting unit to drive the first light emitting unit according to the output duty cycle and the parameter, wherein the circuit is configured to drive the first light emitting unit to produce a plurality of brightness levels according to the duty cycles and the parameter, wherein the duty cycles and the brightness levels define a brightness-duty-cycle response curve which is a piecewise linear function consisting of a plurality of linear functions, wherein the circuit is configured to obtain a setting value, the piecewise linear function comprises at least one turning point, and the at least one turning point comprises one of the duty cycles and a turning-point brightness level, wherein the circuit is configured to interpolate the output duty cycle according to the setting value and the duty cycles.

2. The display device of claim 1, wherein each of the linear functions comprises a slope and a group of duty cycles, and the duty cycles corresponding to the linear functions comprise a first group of duty cycles and a second group of duty cycles, wherein a minimum value of the first group of duty cycles is equal to a maximum value of the second group of duty cycles, the slope of the linear function corresponding to the first group of duty cycles is greater than the slope of the linear function corresponding to the second group of duty cycles.

3. The display device of claim 1, wherein each of the linear functions comprises a slope and a group of duty cycles, and the duty cycles corresponding to the linear functions comprise a first group of duty cycles and a second group of duty cycles, wherein a minimum value of the first group of duty cycles is equal to a maximum value of the second group of duty cycles, and the slope of the linear function corresponding to the first group of duty cycles is less than the slope of the linear function corresponding to the second group of duty cycles.

4. The display device of claim 1, wherein the circuit is configured to calculate the output duty cycle according to a following equation:

$$D_k = D_i + \frac{(D_{i+1} - D_i)}{(B_{i+1} - B_i)} \times (B_k - B_i)$$

wherein $D_k$ denotes the output duty cycle, $B_k$ denotes a brightness level represented by the setting value, i denotes $i^{th}$ turning point which comprises a turning-point brightness level $B_i$ and a duty cycle $D_i$, a $(i+1)^{th}$ turning point comprises a turning-point brightness level $B_{i+1}$ and a duty cycle $D_{i+1}$, and the brightness level $B_k$ is greater than the turning-point brightness level $B_i$ and less than the turning-point brightness level $B_{i+1}$.

5. A display device comprising:

a display panel comprising a plurality of regions;

a backlight module comprising a plurality of light emitting units, wherein each of the regions corresponds to at least one of the light emitting units; and a circuit comprising at least one calibration lookup table corresponding to a first light emitting unit of the light emitting units, wherein the at least one calibration lookup table records a parameter and a plurality of duty cycles, wherein the circuit is configured to access the calibration lookup table to obtain one of the duty cycles and determine an output duty cycle, wherein the circuit is configured to determine a current value of the first light emitting unit to drive the first light emitting unit according to the output duty cycle and the parameter, wherein the circuit is configured to drive the first light emitting unit to produce a brightness level according to one of the duty cycles and the parameter, and the duty cycles and the brightness level define a brightness-duty-cycle response curve which is a linear function, wherein the circuit is configured to obtain a setting value and the circuit interpolates the output duty cycle according to the linear function and the setting value.

6. The display device of claim 5, wherein the circuit is configured to calculate the output duty cycle according to a following equation:

$$D_k = D_n + \frac{D_m - D_n}{m - n} \times (k - n)$$

wherein $D_k$ denotes the output duty cycle, m denotes a maximum dimming level, n denotes a minimum dimming level, k denotes a dimming level corresponding to the setting value, $D_m$ denotes a duty cycle corresponding to the maximum dimming level, and $D_n$ denotes a duty cycle corresponding to the minimum dimming level.

7. The display device of claim 5, wherein the circuit is configured to calculate the output duty cycle according to a following equation:

$$D_k = D_n + \frac{D_m - D_n}{m - n} \times (k - n)$$

wherein $D_k$ denotes the output duty cycle, m denotes a maximum brightness level, n denotes a minimum brightness level, k denotes a brightness level corresponding to the setting value, $D_m$ denotes a duty cycle corresponding to the maximum brightness level, and $D_n$ denotes a duty cycle corresponding to a minimum brightness level.

8. A display device comprising:

a display panel comprising a plurality of regions;

a backlight module comprising a plurality of light emitting units, wherein each of the regions corresponds to at least one of the light emitting units; and a circuit comprising at least one calibration lookup table corresponding to a first light emitting unit of the light emitting units, wherein the at least one calibration lookup table records a parameter and a plurality of duty cycles, wherein the circuit is configured to access the calibration lookup table to obtain one of the duty cycles and determine an output duty cycle, wherein the circuit is configured to determine a current value of the first light emitting unit to drive the first light emitting unit according to the output duty cycle and the parameter, wherein the circuit is configured to perform a local dimming algorithm to calculate a setting value of the first light emitting unit.

* * * * *